(12) United States Patent
Perrier et al.

(10) Patent No.: US 11,878,474 B2
(45) Date of Patent: Jan. 23, 2024

(54) ASSEMBLY OF PARTS MADE FROM THERMOPLASTIC MATERIAL AND METHOD FOR ASSEMBLING SUCH PARTS BY MEANS OF THERMOPLASTIC RIVETING

(71) Applicant: LATECOERE, Toulouse Occitaine (FR)

(72) Inventors: Christophe Perrier, Toulouse (FR); Jean Michel Borlot, Teulat Occitanie (FR)

(73) Assignee: LATECOERE, Toulouse Occitanie (FR)

( * ) Notice: Subject to any disclaimer, the term of this patent is extended or adjusted under 35 U.S.C. 154(b) by 413 days.

(21) Appl. No.: 16/959,192

(22) PCT Filed: Dec. 26, 2018

(86) PCT No.: PCT/EP2018/086875
§ 371 (c)(1),
(2) Date: Jun. 30, 2020

(87) PCT Pub. No.: WO2019/129781
PCT Pub. Date: Jul. 4, 2019

(65) Prior Publication Data
US 2020/0398499 A1    Dec. 24, 2020

(30) Foreign Application Priority Data

Dec. 30, 2017 (FR) ........................................ 1763425
Jan. 27, 2018 (FR) ........................................ 1850649

(51) Int. Cl.
*B29C 65/62* (2006.01)
*B29C 65/56* (2006.01)
(Continued)

(52) U.S. Cl.
CPC ............ *B29C 65/564* (2013.01); *B29C 65/20* (2013.01); *B29C 65/605* (2013.01); *B29C 65/62* (2013.01);
(Continued)

(58) Field of Classification Search
CPC .............................. B29C 65/62; B29C 65/564
See application file for complete search history.

(56) References Cited

U.S. PATENT DOCUMENTS 3,122,465 A * 2/1964 Brandt .................... B29C 66/69
                                                                                156/290
5,186,776 A    2/1993 Boyce et al.
(Continued)

FOREIGN PATENT DOCUMENTS

DE     102004038084     * 3/2006 ............. B29C 65/60
EP            0392568        10/1990
(Continued)

*Primary Examiner* — Philip C Tucker
*Assistant Examiner* — John Blades
(74) *Attorney, Agent, or Firm* — Defillo & Associates, Inc; Evelyn A. Defillo

(57) ABSTRACT

This invention relates to an assembly of regions (10a, 10b) of composite parts (2a, 2b) with thermoplastic matrix, including a plurality of riveting points along regions (10a, 10) of the parts that overlap through the superposition of two faces (12a, 12b) of these regions (10a, 10b) which are positioned facing one another, each region (10a, 10b) having another, opposite, face (11a, 11b) which remains visible with the part (2a, 2b). The riveting is performed using assembly ties (6) made of thermoplastic resin-based composite material compatible with the material of the parts (2a, 2b). These ties (6), which are made up at least in part of a stitch of backstitch produced using a filament of a material selected from a fiber coated with aramid resin, a carbon fiber and a glass fiber, are embedded in said regions (10a, 10b) and (Continued)

passing right through the same with an orientation comprised between 30° and 90° with respect to their faces (11*a*, 11*b*; 12*a*, 12*b*).

6 Claims, 2 Drawing Sheets

(51) Int. Cl.
    *B29C 65/20*     (2006.01)
    *B29C 65/60*     (2006.01)
    *B29C 65/00*     (2006.01)
    *F16B 5/04*     (2006.01)
    *F16B 17/00*     (2006.01)
    *B29L 31/30*     (2006.01)

(52) U.S. Cl.
CPC .... *B29C 66/0242* (2013.01); *B29C 66/02242* (2013.01); *B29C 66/0326* (2013.01); *B29C 66/03241* (2013.01); *B29C 66/1122* (2013.01); *B29C 66/21* (2013.01); *B29C 66/43* (2013.01); *B29C 66/71* (2013.01); *B29C 66/7212* (2013.01); *B29C 66/72141* (2013.01); *B29C 66/73921* (2013.01); *F16B 5/04* (2013.01); *F16B 17/008* (2013.01); *B29L 2031/3082* (2013.01); *B29L 2031/3085* (2013.01); *B29L 2031/3097* (2013.01)

(56) References Cited

U.S. PATENT DOCUMENTS

| | | | | |
|---|---|---|---|---|
| 6,106,646 | A * | 8/2000 | Fairbanks | B29C 65/7437 156/286 |
| 8,893,367 | B2 * | 11/2014 | Lander | B29C 70/24 156/252 |
| 2003/0187082 | A1 * | 10/2003 | Scherba | E04H 15/20 521/30 |
| 2005/0006023 | A1 * | 1/2005 | Johnson | B32B 21/04 156/92 |
| 2018/0141287 | A1 * | 5/2018 | Lander | B29C 70/023 |

FOREIGN PATENT DOCUMENTS

| | | |
|---|---|---|
| GB | 2135632 | 9/1984 |
| GB | 2205374 | 12/1988 |

\* cited by examiner

ASSEMBLY OF PARTS MADE FROM THERMOPLASTIC MATERIAL AND METHOD FOR ASSEMBLING SUCH PARTS BY MEANS OF THERMOPLASTIC RIVETING

CROSS REFERENCE TO RELATED APPLICATION

This application is a national stage entry of PCT/EP2018/086875 filed Dec. 26, 2018, under the International Convention claiming priority over French Patent Application No. FR1763425 filed Dec. 30, 2017 and French Patent Application No. FR1850649 filed Jan. 27, 2018.

TECHNICAL FIELD

The invention relates to an assembly of composite parts with thermoplastic matrix, and to an assembly method for assembling such parts using thermoplastic riveting. It relates more particularly to the assembly of parts with a thermoplastic matrix having high level mechanical performance (strength, deformation, etc.) used notably, although not exclusively, in aeronautical engineering.

In the field of aeronautical engineering, riveting intended to assemble parts needs to create a fault-free join, in particular a join that carries no risk of opening up through shear. In this field, there are various assembly methods used for parts made of metal or made of composite material. Conventionally, metal parts are generally joined using nuts and bolts.

For example, the patent document FR 2 622 257 describes such metal riveting of large panels with pre-holing and pre-riveting at regular intervals.

Regarding the assembly of composite materials, there are a number of other techniques that have also been developed: reinforcing the panels that are to be welded and the use of metal fastenings, possibly after a bonding phase; using joins of the "stitched" type using a filament with high tensile strength (based on "Kevlar", on carbon fiber or on glass fiber, etc.) and using a suitable type of needle. In patent document DE 102004055592 the components made of composite material are preheated before being stitched with filaments selected according to the material of the components, the heated region then being compressed in order to maintain the thickness of the components as a whole.

These known techniques are ordinarily referred to by their English-language names of stitching, tufting, lock stitching or Z-pinning. Advantageously, the stitching may be reinforced with an injection of resin, after the join has been made. However, these techniques are difficult to apply to thermoplastic materials which exhibit significant stiffness at ambient temperature.

PRIOR ART

On the passenger doors of commercial airplanes based on a stiffened structure/pressurized panel architecture, the interface between the flanges of the stiffened structure and the panel provides the resistance to pull-out induced by the pressure loading of the panel. The non-propagation of a fault (such as delamination resulting from barely visible impact damage (BVID)) potentially arising within the composite material of which the architecture is made.

Solutions have made it possible to improve the assembly of parts made of thermosetting composite material, but these solutions do not adapt to the case of parts made of thermoplastic composite material. One method for assembling thermoplastic parts, referred to as TAP (which stands for "Thermally Assisted Pinning") recommends heating pins above the melting point of the resin then holing the two thermoplastic parts that are to be assembled. The end of the pin which protrudes from the other side of the two thermoplastic parts is then cut off, the pin portion remaining in the thickness of the material serving to join the two parts. This method has the disadvantage of encouraging resin-to-metal contact which exhibits poor pull-out strength, this being an aspect that is particularly critical in fields in which the parts are subjected to high mechanical stresses, particularly in the aeronautical or space fields.

Another solution, set out in patent document U.S. Pat. No. 5,186,776, recommends a method of riveting a composite material using metal stakes inserted into the composite material which is heated and subjected to vibrations of the ultrasound type, this stake preferably being inserted using a cylindrical tool surrounding the stake. However, the use of ultrasound is suitable only for metal stakes and also has the disadvantage of resin-to-metal contact.

Another solution, developed in patent documents GB 2 205 374 or EP 0 392 568, consists in orienting the reinforcing fibers in a high-temperature thermoplastic rivet and in assembling the parts using a suitable heat treatment. That solution is unable to guarantee high pull-out strength.

SUMMARY OF THE INVENTION

The invention seeks to overcome these disadvantages and in order to do so the invention makes provision for using a riveted join made of plastic compatible with composite parts with thermoplastic matrix while at the same time having characteristics of high mechanical strength, particularly pull-out strength.

More specifically, one subject of the present invention is an assembly of composite parts with thermoplastic matrix. Such an assembly comprises a plurality of riveting performed by stitching assembly ties made up of material compatible with the material of the parts, these ties being embedded in said regions and pass right through the same points along regions of the parts that overlap through the superposition of two faces of these regions which are positioned facing one another. Each region has another, opposite, face which remains visible with the part. In this assembly system, the assembly ties are made of thermoplastic resin-based composite material. These ties are made up, at least in part, of a stitch of backstitch (or tufting) produced using a filament of fiber coated with aramid resin. The two parts joined in this way therefore have a high pull-out strength and a high shear strength.

The term "part" is generic and refers equally well to a panel, a fairing, a skin, a beam, a frame, a stringer, a crossbeam, a web, a support or any other element that is to be assembled.

According to preferred embodiments:
 the assembly tie is made of a composite material selected from a resin reinforced with continuous fibers, a resin reinforced with cut lengths of fiber, particularly short or long cut lengths according to the composite material of the assembled parts and/or according to the thickness of these parts, the resin advantageously being sectioned in situ after insertion, and carbon nanotubes;
 the assembly tie takes a form selected from a strand, a staple coupling two adjacent strands with a continuous-fibers resin, an insert and a combination of strand, staple and/or stitch, at least one stitch of backstitch being in this assembly tie; advantageously these various types of tie coexist within the one same assembly of parts;

the parts are made of laminates with high levels of physical performance of aeronautical or aerospace grade, particularly having a thermoplastic matrix based on PPS (polyphenylene sulfide), PEEK (polyetheretherketone), PEKK (polyetherketoneketone), PEI (polyetherimide), PAI (polyamide imide) or PI (polyimide) according to the excellence of qualities to be prioritized (compression strength, impact resistance, ability to resist chemical agents, withstand temperature, etc.), advantageously reinforced with glass fiber, boron fiber, carbon fiber or any other woven or nonwoven reinforcing-fiber material;

the regions of the parts that are to be assembled may be situated in any portion of these parts, either at the edge or in internal and central portions, and independently of one or the other part.

The invention also relates to an assembly method for assembling parts using thermoplastic riveting using transversely holed heating panels, this method proceeding according to the following steps:

overlapping the parts by superposing two faces of two regions facing one another, each part having another, opposite, face which remains visible;

bringing a holed heating panel into position on each face of visible region in such a way that the holes are positioned facing one another;

using the heating panels to heat the regions of the parts, from their opposite faces, to a temperature at which a holing spike will penetrate in order to begin to melt the regions of the superposed faces, the regions being able to represent the entirety of the parts;

inserting at least one holing spike through a first heating panel, with successive holing of the first and of the second part so as to create at least one cylindrical bore;

withdrawing the holing spike, it being possible for this withdrawal to be performed by continuous movement in the same direction ("forward") or in the opposite direction ("in reverse");

inserting an assembly tie made of thermoplastic resin-based composite material into each cylindrical bore as far as the visible face of the second part, this tie being made up at least in part of a stitch formed of backstitch produced using a filament of fiber coated with aramid resin;

withdrawing the holed heating panels and in their place installing consolidation tooling that works by heating under pressure, to melt the material of which the assembly tie is made with that of the parts, followed by cooling.

According to preferred embodiments:

the assembly tie made of thermoplastic material is a reinforcing element that has a shape that complements the cylindrical bore;

in that case, the assembly tie protruding beyond the visible face of the first part is cut after the first heating panel is withdrawn and before the consolidation tooling is installed;

the assembly tie made of thermoplastic material is the creation of a stitch between two filaments by the passage of a stitching needle through the cylindrical bore.

According to particularly advantageous embodiments, the method according to the invention may make provision for:

automating steps of simultaneous assembly of several parts that are to be assembled; in particular a holing grid for the holing of the parts may be used for simultaneously holing the parts using the holing spikes;

in the event that the assembly tie is a reinforcing element, driving this element through after the holing spike which emerges from the thermoplastic material by traveling in the direction in which it is introduced;

generating a countersunk head on the first region from corresponding geometry of the holing spike, the countersunk head being extended by the hole so as to facilitate the insertion of the assembly tie, the reinforcing element or the stitch, and creating a rivet-heading die in the second heating panel brought into position against the visible face of the second part so as to anchor the reinforcing element on this face by forming an upset head after compression and heating.

The assembly by thermoplastic riveting is reinforced by the geometry of the cylindrical bores: the diameter, the distance between the rows of bores, the distance between the bores of the one same row. This assembly is also reinforced by the characteristics of the strands or the legs of these staples: the nature of the resin of the material, identical to or physically/chemically compatible with the material of the parts being assembled; the typology of the fibers, continuous or adapted in terms of length, and their metal filler being sufficient to ensure electrical continuity. The materials employed for the assembly parts are of the same nature, either similar or at least physically/chemically compatible.

This method may be applied in particular to reinforcing the assembly of parts that have already been joined together by welding, induction, bonding or any equivalent means, at the time of construction, during maintenance or during repairs.

Another subject of the invention is an item of equipment with high mechanical strength such as a structure of an aircraft or of a satellite (particularly an aircraft door, box sections (of a pylon, wing box, landing gear bay box, fin box, etc.), fuselage, wing or cell of aircraft and satellites, panels, etc.) having an architecture with a stiffened structure and pressurized panel made of composite material, wherein structures and panels are assembled in accordance with the assembly of parts defined hereinabove, in particular by implementing the method described hereinabove.

DESCRIPTION OF THE FIGURES

Further information, features and advantages of the present invention will become apparent from reading the following nonlimiting description given with reference to the attached figures which respectively depict.

In the figures of this document, elements that are identical or analogous are identified by the same reference sign which refers to the passage(s) of the description in which it is mentioned.

DETAILED DESCRIPTION

Figure 1:
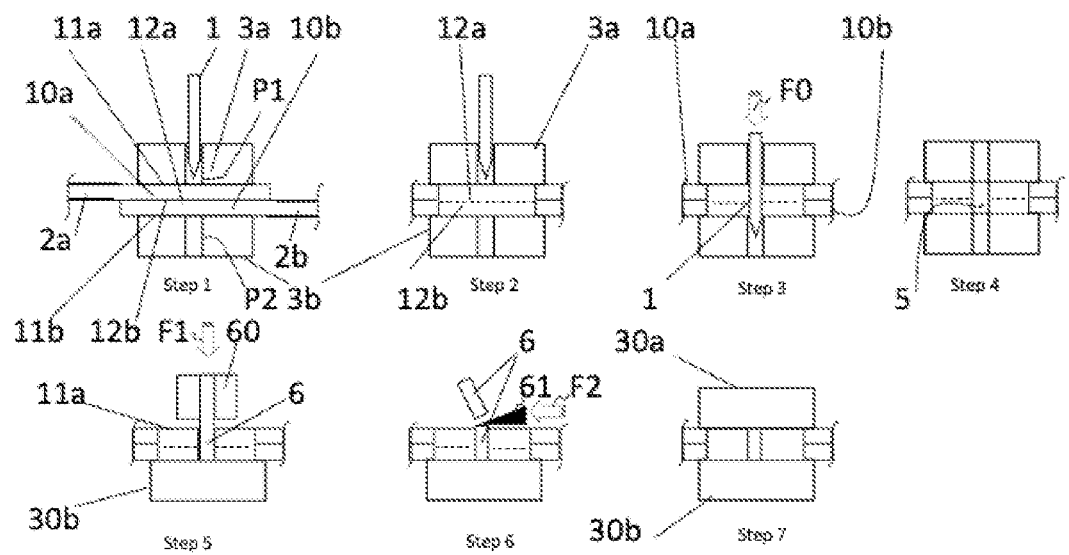
FIG. 1: a view of one example of steps of the method for assembling two parts made of thermoplastic material by thermoplastic riveting.

FIG. 1 gives an example in seven main steps of the method according to the invention for assembling, by thermoplastic riveting, two parts 2a, 2b of the architecture of an airplane door made of thermoplastic material. In this example, the parts 2a, 2b are assembled via their end regions delimited by their edges 10a and 10b, but the method may be applied to the assembly of parts in regions situated at the center of these parts. The thermoplastic material here is PEEK (phenylene polyetheretherketone). This riveting involves the use of a holing spike 1, two holed heating panels 3a and 3b for the passage of the holing spike 1, and two non-holed heating panels 30a and 30b.

This method proceeds according to the following steps:

Step 1: superposing the edges 10a and 10b of the parts 2a, 2b made of thermoplastic material, these edges 10a, 10b therefore each having: a visible edge face 11a, 11b and a non-visible central edge face 12a, 12b pressed against the other central edge face 12b, 12a; and positioning on each visible edge face 11a, 11b a holed heating panel 3a and 3b; the holes P2 and P3 are—in this example—perpendicular to the edge faces 11a, 11b and 12, 12b, but could be inclined with respect to these faces, particularly in the range of orientations comprised between 30 to 90°;

Step 2: using the holed heating panels 3a and 3b to heat the edges 10a and 10b of the two parts 2a, 2b made of thermoplastic material, this heating being performed to a temperature a few degrees higher than the melting point of the thermoplastic material; the non-visible central faces 12a and 12b thus progressively beginning to melt together;

Steps 3 and 4: inserting a holing spike 1 (arrow F0) through the holed heating panels 3a and 3b, with a first edge 10a followed by a second edge 10b of these two parts made of PEEK being holed almost simultaneously in order to create a cylindrical bore 5 with a circular base in this example; the holing spike 1 is then withdrawn either by continuing to move it in the same direction as its direction of insertion ("forward") as in the example, or by moving it in the opposite direction ("in reverse");

Step 5: replacing one of the holed heating panels (in this exemplary embodiment, the first panel 3b) with a non-holed heating panel 30b so as to allow even heating of the two edges 10a and 10b; and then replacing the second holed heating panel 3a, thus uncovering the visible edge face 11a; a strand 6 made of a composite material with a thermoplastic matrix, in this example made of PEEK, is then inserted into the cylindrical bore 5 using a tool 60 (arrow F1);

Step 6: the strand 6 is cut off in situ at the correct height, namely so that it barely protrudes beyond the edge face 11a—using a tool 61 (arrow F2);

Step 7: a non-holed heating panel 30a is positioned on the uncovered face 11a, also covering the cut strand 6; the two non-holed heating panels then compress and heat the two edges 10a and 10b of the parts made of thermoplastic material; in this way, this heating allows the two non-visible central faces 12a and 12b and, advantageously, the laminated reinforcing material with high mechanical performance (in this example made of PEEK and carbon fiber) of the assembly parts to melt together with the material of the two edges 10a and 10b.

Figure 2:
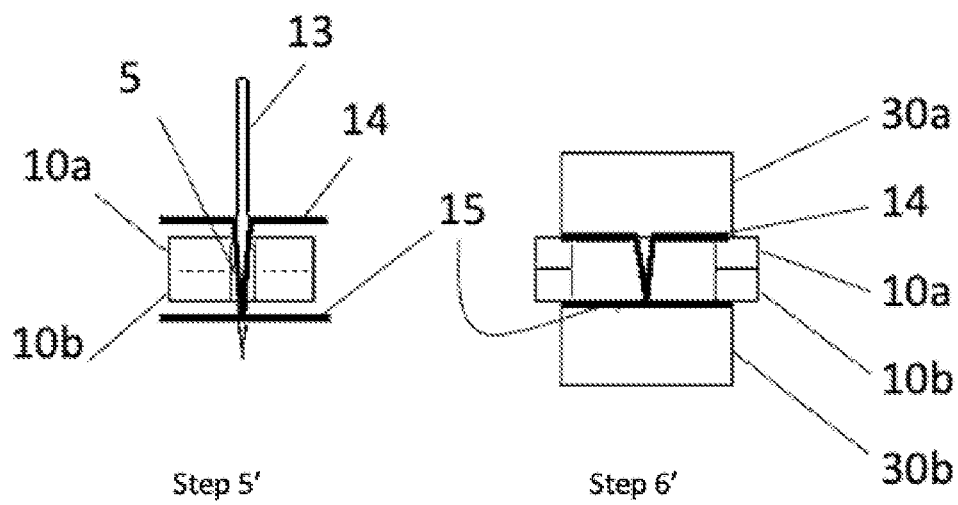
FIG. 2: a variant of the method of FIG. 1, using a stitch.

FIG. 2 shows a variant of the method of FIG. 1 regarding the use of a stitch, produced using two filaments 14 and 15. These filaments are made of fibers coated with thermoplastic resin, of aramid resin of the "Kevlar" type in this example, which have a high tensile strength. Alternatively, the "Kevlar" fiber may be replaced with carbon fiber or glass fiber. Steps 1 to 4 of FIG. 1 are identical to those of the method using a strand. Then, for the use of a stitch (or "stitching"), a stitching needle 13 is introduced into the cylindrical bore 5 from the side of the edge 10a (step 5'). The stitching needle 13 carries the filament 14, and this filament 14 is knotted with the other filament 15 which runs along the edge 10b (step 6'). Other types of stitch can also be used (lock stitching, etc.).

Figure 3:
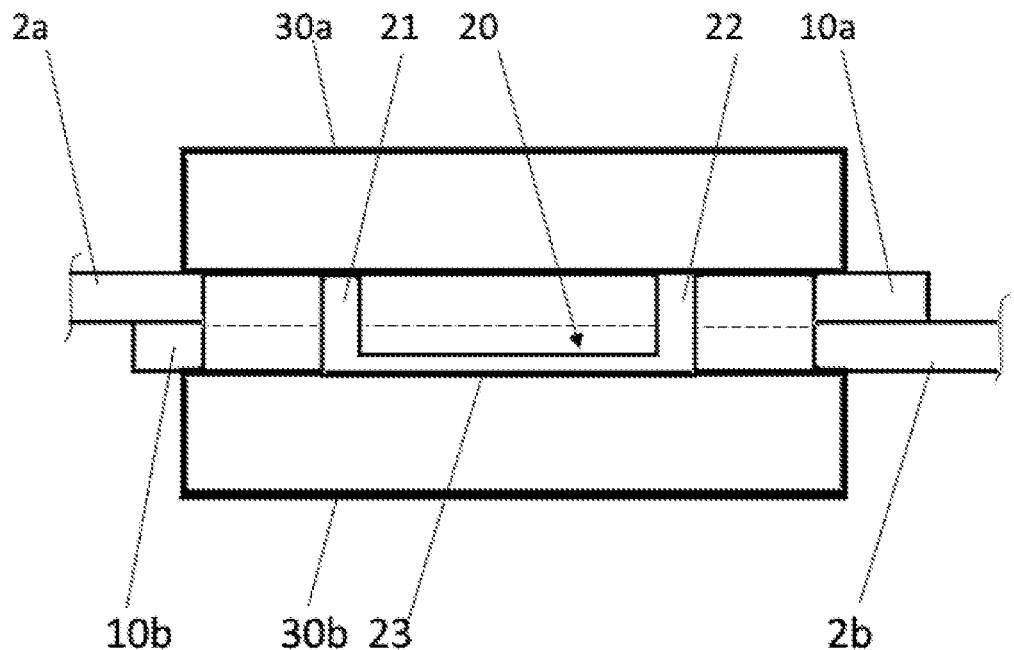
FIG. 3: a view of riveting according to one exemplary embodiment of the invention using a staple.

FIG. 3 illustrates one example of the use of a staple 20 in the context of the method of assembling the two edges 10a and 10b of the parts made of thermoplastic material using thermoplastic riveting. A staple 20, made of thermoplastic material with continuous fibers, is inserted simultaneously into two adjacent bores 5 (cf. FIG. 1, step 4) for thermoplastic riveting according to the invention, via its two legs 21 and 22. The central joining portion 23 of the staple 20 is flattened against the edge 10b during the heating by the heating panels 30a and 30b.

Figure 4:
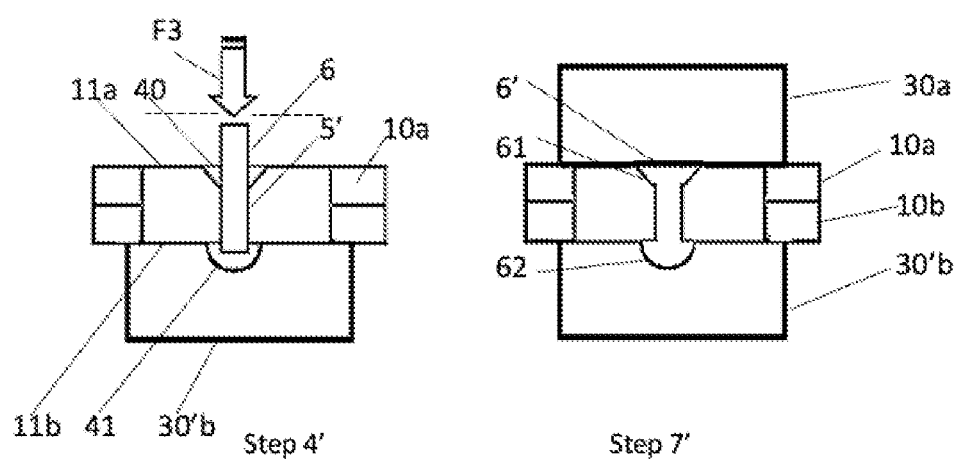
FIG. 4: a variant of the method of FIG. 1, using a cylindrical bore for a strand with a countersunk head and an end that is domed by means of a rivet-heading tool.

The schematic views in FIG. 4 show a variant of the last steps of the method of FIG. 1, using a particular cylindrical bore 5' to insert (arrow F3) the strand 6. This bore 5' is created by a holing spike (cf. FIG. 1) the geometry of which is adapted in that it has a conical tapered end shape so as to create a corresponding widened entrance 40 for a countersunk head (step 4'). Thanks to this widened entrance 40, the strand 6 becomes easier to insert and its anchorage is reinforced in the way described hereinbelow. After insertion, the strand 6 is cut off to leave an excess end portion overhanging the face 11a. Its other edge is "headed" using a rivet-heading tool which forms a rivet-heading die 41 in the heating panel 30'b (step 4'). Through compression and heating using the panels 30a and 30'b, the other end of the strand 6 is headed into the shape of a hemispherical upset head 62 (step 7'). The widened entrance 40 and the rivet-heading die 41 thus allow optimized anchorage of the strand 6, the excess material occupying the empty space of the recesses 40 and 41, thus creating the widened ends of the strand 6.

The invention is not restricted to the exemplary embodiments described and depicted. Thus, in the heating system, the heating part may be the holding spike rather than the heating panels. Or alternatively, non-holed heating panels may supplement the holed heating panels during the course of the steps of the method.

The cylindrical bores created in the heating panels may have a circular, polygonal or oblong base.

The widened entrances to the bores may also be created by any machining method: milling, routing, turning, etc.

Furthermore, the assembly tie may be is made up of a composite material based on thermoplastic resin reinforced with any known and suitable filler element.

The invention claimed is:

1. An assembly method for composite parts with a thermoplastic-matrix material, using thermoplastic riveting, the method comprising the following steps:
   overlapping first and second parts by superposing two edge faces of regions facing one another, each part having another opposite face, which remains visible;
   bringing a holed heating panel into position on each visible face in such a way that the holes are positioned facing one another;
   heating the visible faces to a temperature higher than the melting point of the thermoplastic-matrix material of the parts to begin melting regions of the superposed faces;

inserting at least one holing spike through a first holed heating panel, with successive holing of the first and of the second parts, creating at least one cylindrical bore;

withdrawing the holing spike by continuously moving in the same direction of the insertion or in the opposite direction of the insertion;

replacing one of the holed heating panels with a non-holed heating panel; and removing a second holed heating panel, thus uncovering a visible face;

wherein an assembly tie comprising a strand made of a composite material with a thermoplastic matrix is then inserted into the cylindrical bore;

wherein the strand is cut off in situ at a correct height;

wherein a second non-holed heating panel is positioned on the uncovered face, also covering the cut strand;

wherein the two non-holed heating panels then compress and heat the two edges of the parts made of thermoplastic material.

2. The assembly method as claimed in claim 1, wherein the assembly tie is made of a thermoplastic material having a reinforcing element that has a shape that complements the at least one cylindrical bore.

3. The assembly method as claimed in claim 2, wherein, in the event that the assembly tie is a reinforcing element, the reinforcement element is carried through after the holing spike which emerges from the thermoplastic material by traveling in the direction in which is introduced.

4. The assembly method as claimed in claim 1, wherein the assembly tie protrudes beyond the visible face of the first part and is cut before consolidation tooling is installed.

5. The assembly method as claimed in claim 1, wherein provision is made for automating steps of simultaneous assembly of several parts that are to be assembled.

6. The assembly method as claimed in claim 5, wherein a holing grid for the holing of the parts is used for simultaneously holing the parts using a plurality of holing spikes.

* * * * *